United States Patent [19]
Olgren et al.

[11] Patent Number: 5,941,130
[45] Date of Patent: Aug. 24, 1999

[54] ADJUSTABLE STEERING COLUMN FOR MOTOR VEHICLE

[75] Inventors: Leland Nels Olgren, Frankenmuth; Melvin Lee Tinnin, Clio, both of Mich.

[73] Assignee: General Motors Corporation, Detroit, Mich.

[21] Appl. No.: 09/056,221

[22] Filed: Apr. 7, 1998

[51] Int. Cl.⁶ ............................... B65D 1/18; F16H 25/24
[52] U.S. Cl. ................... 74/493; 74/89.15; 74/424.8 A; 188/67; 280/775
[58] Field of Search ............................ 74/89.15, 424.8 A, 74/493; 188/67; 280/775

[56] References Cited

U.S. PATENT DOCUMENTS

| | | | |
|---|---|---|---|
| 4,472,982 | 9/1984 | Nishikawa | 74/493 |
| 4,541,298 | 9/1985 | Strutt | 74/493 |
| 4,732,050 | 3/1988 | Vollmer | 74/493 |
| 4,782,715 | 11/1988 | Chevance | 74/424.8 R |
| 5,009,120 | 4/1991 | Iseler et al. | 74/493 |
| 5,052,240 | 10/1991 | Miyoshi et al. | 74/493 |
| 5,117,707 | 6/1992 | Kinoshita et al. | 74/493 |
| 5,161,425 | 11/1992 | Baskett et al. | 74/493 |
| 5,199,319 | 4/1993 | Fujiu | 74/493 |
| 5,689,995 | 11/1997 | Heckel, Jr. | 74/89.15 |

*Primary Examiner*—Allan D. Herrmann
*Attorney, Agent, or Firm*—Edmund P. Anderson

[57] ABSTRACT

A steering column including a mast jacket pivotable up and down for vertical adjustment of the steering column and variable lengthwise for horizontal adjustment of the steering column. A clamp includes a first rotatable screw shaft on a stationary bracket perpendicular to a longitudinal centerline of the steering column, a second rotatable screw shaft on the mast jacket parallel to the longitudinal centerline of the steering column, a first split nut on the first screw shaft, and a second split nut on the second screw shaft. The first split nut and the first screw shaft cooperate in converting vertical adjustment of the steering column into idling rotation of the first screw shaft. The second split nut and the second screw shaft cooperate in converting horizontal adjustment of the steering column into idling rotation of the second screw shaft. A manual operating lever of the clamp rotates a control shaft which squeezes the first and the second split nuts against the first and the second screw shafts to frictionally couple the split nuts and the screw shafts and thereby capture the position of the steering column.

9 Claims, 2 Drawing Sheets

ADJUSTABLE STEERING COLUMN FOR MOTOR VEHICLE

TECHNICAL FIELD

This invention relates to adjustable steering columns for motor vehicles.

BACKGROUND OF THE INVENTION

A typical motor vehicle steering column includes a tubular mast jacket, a steering shaft supported on the mast jacket for rotation about a longitudinal centerline of the steering column, and a steering hand wheel attached to the steering shaft at the top of the steering column. The mast jacket may be pivotable up and down on a body of the motor vehicle to adjust the vertical position of the steering hand wheel and/or the length of the mast jacket may be variable to adjust the horizontal position of the steering hand wheel. Such adjustable steering columns typically include a clamp by which a stationary bracket and the mast jacket are squeezed together to capture by friction the position of the mast jacket. To enhance the friction couple between the mast jacket and the stationary bracket, it is known to form teeth on the stationary bracket and on the mast jacket which mesh when the clamp closes and which unmesh when the clamp opens. A motor vehicle steering column according to this invention is a novel alternative to the aforesaid adjustable steering columns having friction clamps and enhanced friction clamps.

SUMMARY OF THE INVENTION

This invention is a new and improved steering column for a motor vehicle including a mast jacket pivotable up and down for vertical adjustment of the steering column and variable lengthwise for horizontal adjustment of the steering column. A clamp includes a first rotatable screw shaft on a stationary bracket perpendicular to a longitudinal centerline of the steering column, a second rotatable screw shaft on the mast jacket parallel to the longitudinal centerline of the steering column, a first split nut on the first screw shaft, and a second split nut on the second screw shaft. The first split nut and the first screw shaft cooperate in converting vertical adjustment of the steering column into idling rotation of the first screw shaft. The second split nut and the second screw shaft cooperate in converting horizontal adjustment of the steering column into idling rotation of the second screw shaft. A manual operating lever of the clamp rotates a control shaft which squeezes the first and the second split nuts against the first and the second screw shafts to frictionally couple the split nuts and the screw shafts and thereby capture the position of the steering column.

DESCRIPTION OF THE PREFERRED EMBODIMENT

Figure 1:
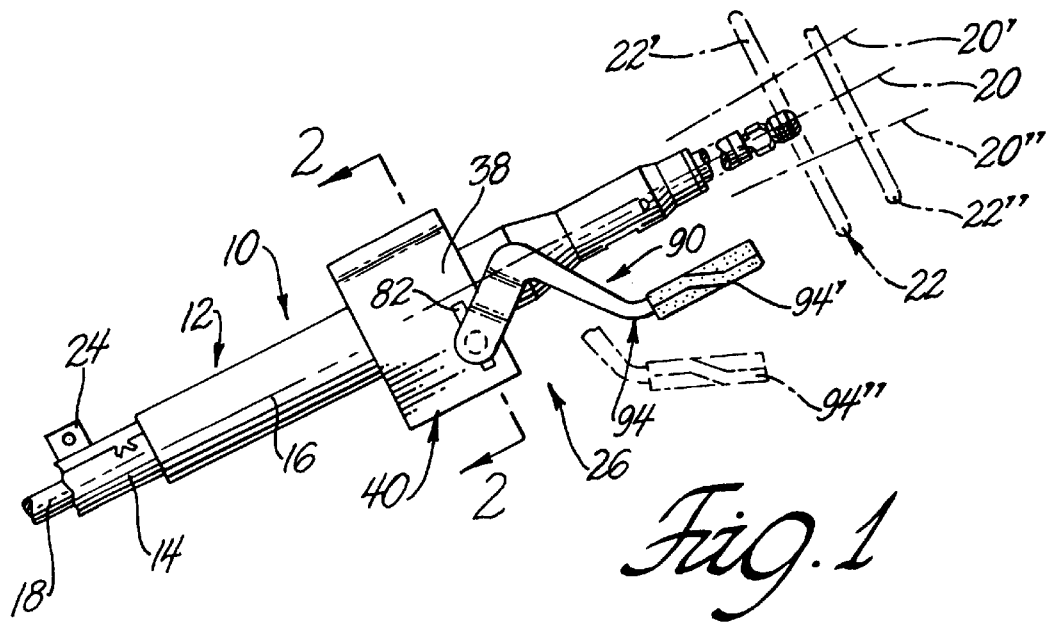
FIG. 1 is a fragmentary elevational view of an adjustable steering column according to this invention for a motor vehicle.
Figure 2:
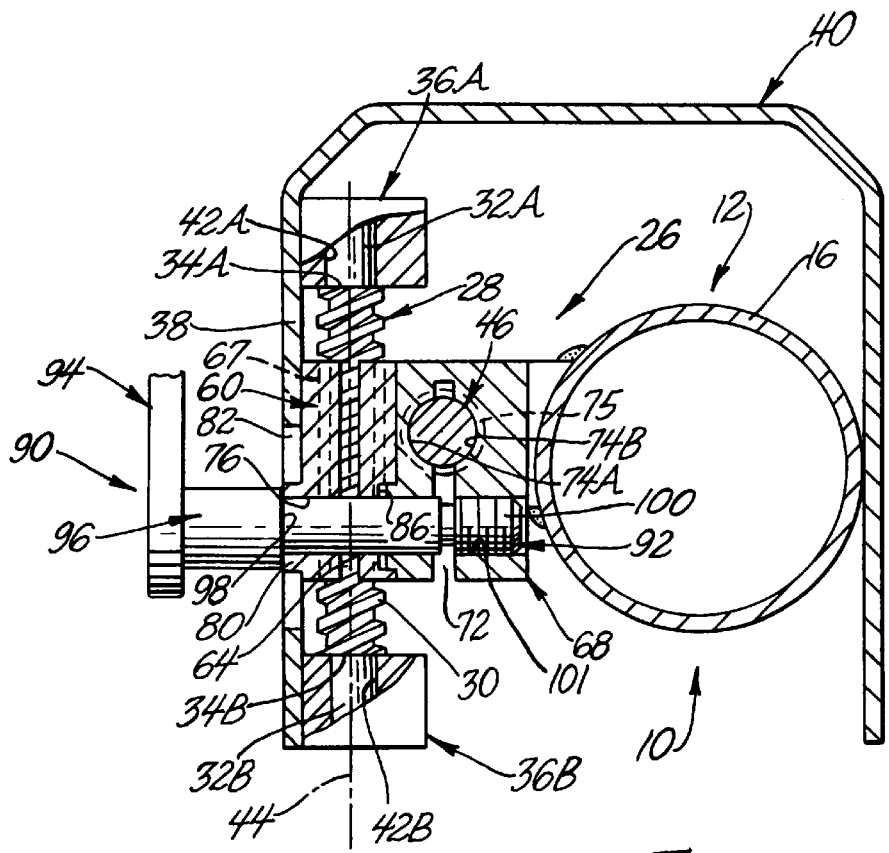
FIG. 2 is an enlarged sectional view taken generally along the plane indicated by lines 2—2 in FIG. 1.
Figure 3:
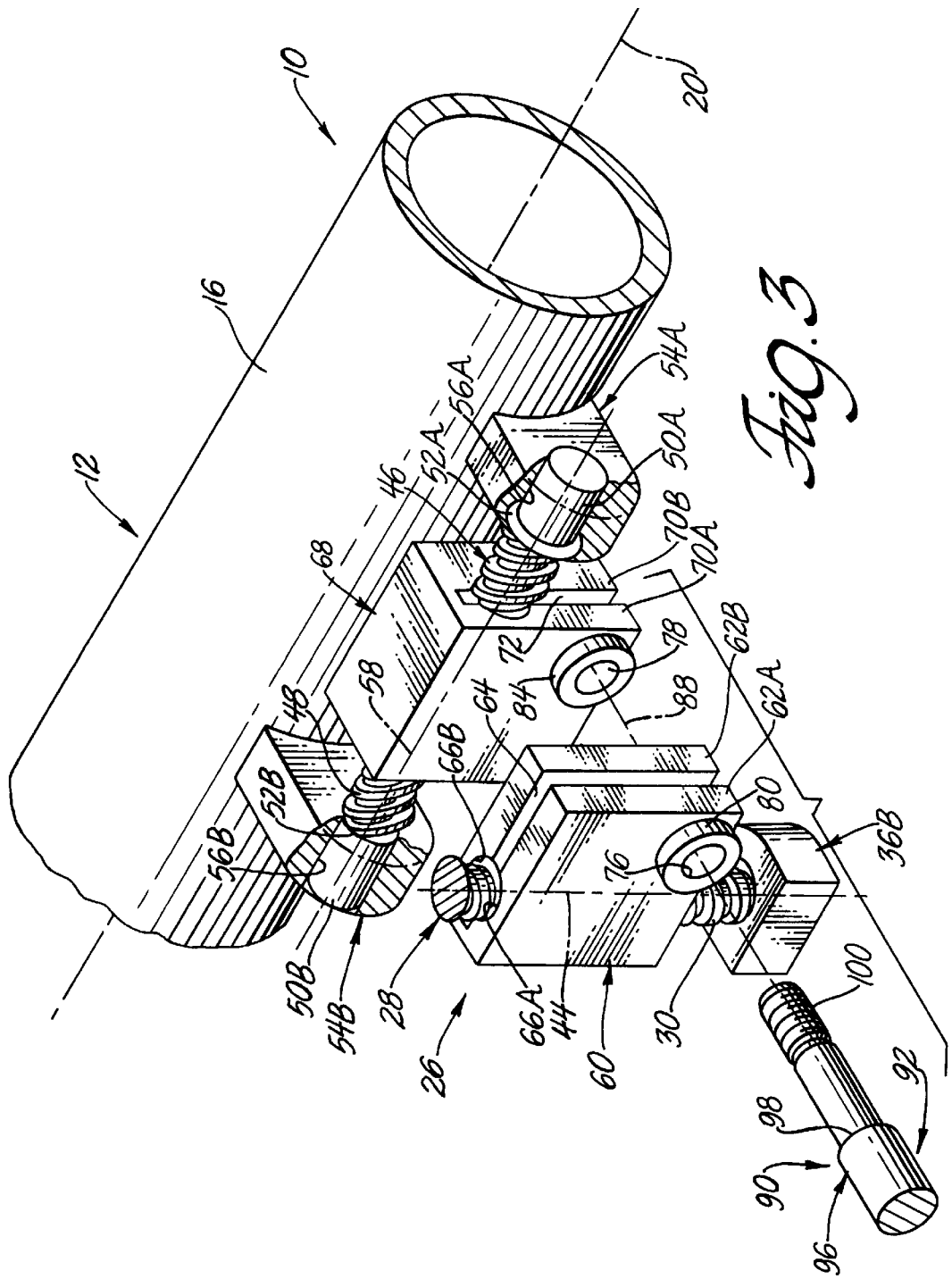
FIG. 3 is an exploded perspective view of a clamp of the adjustable steering column according to this invention.

Referring to FIGS. 1–3, a steering column 10 according to this invention has a schematically represented tubular mast jacket assembly 12 including a lower mast jacket 14 and an upper mast jacket 16 telescopically overlapping the lower mast jacket. A steering shaft 18 is supported on the mast jacket assembly for rotation about a longitudinal centerline 20 of the steering column. A steering hand wheel 22 is rigidly attached to the steering shaft 18 at the top of the steering column. The mast jacket assembly 12 is connected to a body, not shown, of a motor vehicle at pivot bracket 24 on the lower mast jacket 14. The steering column 10 is adjustable vertically by up and down pivotal movement of the mast jacket assembly between an upper limit position 20' and a lower limit position 20". The mast jacket assembly 12 is variable lengthwise for horizontal adjustment of the steering column by linear translation of the upper mast jacket 16 relative to the lower mast jacket 14 in the direction of the longitudinal centerline 20 between an inner limit position 22' and an outer limit position 22".

A clamp 26 on the steering column 10 includes a schematically represented first screw shaft 28 having an outside screw thread 30 thereon, a pair of plain cylindrical journals 32A,32B at opposite ends thereof, and a pair of annular shoulders 34A,34B between the plain cylindrical journals and the opposite ends of the outside screw thread. A first pair of trunnions 36A,36B are rigidly attached to a vertical side 38 of a stationary bracket 40 attached to the aforesaid body of the motor vehicle. A pair of plain bores 42A,42B in the trunnions 36A,36B cooperate with respective ones of the plain cylindrical journals 32A,32B on the first screw shaft in supporting the first screw shaft on the stationary bracket for rotation about a first centerline 44 of the clamp substantially perpendicular to the longitudinal centerline 20 of the steering column. The annular shoulders 34A,34B on the first screw shaft define thrust bearings which cooperate with facing sides of the trunnions 36A,36B in preventing linear translation of the first screw shaft in the direction of the first centerline 44.

The clamp 26 further includes a schematically represented second screw shaft 46 having an outside screw thread 48 thereon, a pair of plain cylindrical journals 50A,50B at opposite ends thereof, and a pair of annular shoulders 52A,52B between the plain cylindrical journals and the opposite ends of the outside screw thread. A second pair of trunnions 54A,54B are rigidly attached to the upper mast jacket 16. A pair of plain bores 56A,56B in the trunnions 54A,54B cooperate with respective ones of the plain cylindrical journals 50A,50B on the second screw shaft in supporting the second screw shaft on the mast jacket for rotation about a second centerline 58 of the clamp 26 parallel to the longitudinal centerline 20 of the steering column. The annular shoulders 52A,52B on the second screw shaft define thrust bearings which cooperate with facing sides of the trunnions 54A,54B in coupling the second screw shaft to the upper mast jacket 16 for linear translation as a unit therewith in the direction of the second centerline 58.

A first split nut 60 constitutes a first clamp body of the clamp 26 and includes a pair of laterally flexible jaws 62A,62B separated by a slot 64. A pair of grooves 66A,66B in respective ones of the jaws 62A,62B of the first split nut face each other and define a passage in the first split nut around the first screw shaft intersected by the slot 64. A schematically represented inside screw thread 67 in the passage defined by the grooves 66A,66B in the first split nut meshes with the outside screw thread 30 on the first screw shaft 28. A second split nut 68 constitutes a second clamp body of the clamp 26 and includes a pair of laterally flexible jaws 70A,70B separated by a slot 72. A pair of grooves 74A,74B, FIG. 2, in respective ones of the jaws 70A,70B of the second split nut face each other and define a passage in the second split nut for the second screw shaft 46 intersected by the slot 72. A schematically represented inside screw thread 75 in the passage defined by the grooves 74A,74B in the second split nut meshes with the outside screw thread 48 on the second screw shaft 46.

The first split nut bears flush against the second split nut and against the vertical side 38 of the stationary bracket. A bore 76 in the first split nut traverses each of the flexible jaws 62A,62B across the slot 64. A bore 78 in the second split nut traverses each of the flexible jaws 70A,70B across the slot 72. A raised tubular boss 80 on the first split nut 60 around the bore 76 seats in a slot 82 in the vertical side 38 of the stationary bracket parallel to the first centerline 44 of the clamp. A raised tubular boss 84 on the second split nut around the bore 78 is rotatably journaled in a counterbore 86 in the first split nut around the bore 76.

The tubular boss 84 and the counterbore 86 cooperate in aligning the bores 76,78 and in accommodating relative rotation between the first and the second split nuts about a third centerline 88 of the clamp. The tubular boss 84 and the counterbore 86 cooperate with the first and the second screw shafts in coupling together the first and the split nuts for unitary linear translation relative to the vehicle body in the direction of the first centerline 44 of the clamp while restraining such unitary linear translation relative to the vehicle body in the direction of the second centerline 58. The first and the second split nuts 60,68 are prevented from rotating about the first and the second centerlines 44,58 of the clamp by interference with the upper mast jacket 16 and the vertical side 38 of the stationary bracket.

To manually horizontally adjust the steering column 10, a force is applied to the upper mast jacket 16 to induce linear translation thereof in the direction of the longitudinal centerline 20 of the steering column. Because the first and the second split nuts 60,68 are coupled together and restrained in that direction, the thrust bearings between the second screw shaft 46 and the trunnions 54A,54B convert the manual thrust on the upper mast jacket parallel to the second centerline 58 of the clamp into idling rotation of the second screw shaft 46 about the second centerline.

To manually vertically adjust the steering column 10, a force is applied to the upper mast jacket 16 to pivot the mast jacket assembly 12 substantially in the direction of the first centerline 44 of the clamp. Because the first and the second split nuts 60,68 are coupled together for unitary linear translation in that direction while the thrust bearings between the first screw shaft 28 and the trunnions 36A,36B restrain the first screw shaft in that direction, the manual thrust on the mast jacket assembly in the direction of the first centerline 44 of the clamp is converted into idling rotation of the first screw shaft about the first centerline. It is contemplated that the steering column can be adjusted vertically and horizontally at the same time.

A control means 90 of the clamp 26 includes a control shaft 92 and an operating lever 94 rigidly attached to an outboard end of the control shaft. The control shaft 92 has a cylindrical shank 96 which cooperates with the bores 76,78 in the first and the second split nuts in supporting the control shaft on the split nuts for rotation about the third centerline 88 of the clamp. An annular shoulder 98 on the shank of the control shaft outboard of the first split nut 60 bears flush against the vertical side 38 of the stationary bracket over the slot 82. An outside screw thread 100 on the control shaft meshes with a schematically represented inside screw thread 101 in the bore 78 in the outboard flexible jaw 70B on the second split nut 68. The inside and outside screw threads 100,101 constitute a motion converting means between the control shaft and the second split nut 68. The manual operating lever 94 has a locked position 94' and an unlocked position 94", FIG. 1.

With the operating lever 94 in its unlocked position 94", the depth of the slots 64,72 in the first and the second split nuts perpendicular to the flexible jaws thereof is maximum as are the diameters of the passages in the split nuts around the first and the second screw shafts. Consequently, friction between the inside screw threads on the first and the second split nuts and corresponding ones of the outside screw threads 30,48 on the first and the second screw shafts is minimum. Thus, when manual effort is applied to the mast jacket assembly 12 to adjust the steering column horizontally and vertically, the first and the second split nuts 60,68 induce idling rotation of the first and the second screw shafts 28,46 as described above.

When a comfortable position of the steering hand wheel 22 is attained, the operating lever 94 is pivoted manually from its unlocked position 94" to its locked position 94'. Pivotal movement of the operating lever induces corresponding rotation of the control shaft 92 so that the control shaft is tensioned between the annular shoulder 98 on the shank 96 thereof and the outboard flexible jaw 70B on the second split nut 68. The flexible jaws 62A,62B and 70A,70B of the first and the split nuts are thus concurrently squeezed together to reduce the diameters of the passages therein around the first and the second screw shafts 28,46. Accordingly, the inside screw threads 67,75 on the first and the second split nuts are thrust against corresponding ones of the outside screw threads 30,48 on the first and the second screw shafts to frictionally couple the first screw shaft and the first split nut and the second screw shaft and the second split nut. With idling rotation of the first and the second screw shafts thus blocked, the horizontal and vertical adjusted positions of the steering column are captured coincidentally. To release the steering column for further adjustment, the manual operating lever 94 is pivoted from its locked position 94' to its unlocked position 94" to interrupt the friction couples between the first and the second split nuts and the first and the second screw shafts.

An important feature of this invention is that the clamp 26 affords infinite horizontal and vertical adjustability of the steering column 10. Another important feature of this invention is that the inside and the outside screw threads on the first and the second split nuts 60,68 and on the first and the second screw shafts 28,46 afford substantial surface areas in frictional engagement for maximum clamping integrity.

Having thus described the invention, what is claimed is:

1. A steering column for a motor vehicle including
   a mast jacket supported on a body of said motor vehicle for adjustment in one of a horizontal direction and a vertical direction, and
   a clamp for releasably capturing a selected position of said mast jacket,
   characterized in that said clamp comprises:
   a screw shaft supported on a first one of said mast jacket and said vehicle body for rotation about a centerline of said clamp having an outside screw thread thereon,
   a thrust bearing means operative to prevent linear translation of said screw shaft relative to said one of said mast jacket and said vehicle body in the direction of said centerline of said clamp,
   a clamp body having a variable diameter passage around said screw shaft and an inside screw thread in said passage meshing with said outside screw thread on said screw shaft, an attachment means operative to attach said clamp body to a second one of said mast jacket and said vehicle body so that said inside and said outside screw threads cooperate to induce idling rotation of said screw shaft in response to adjustment of said mast jacket in said one of said horizontal and said vertical directions of adjustment, and a control means operative to reduce the diameter of said variable diameter passage in said clamp body in response to pivotal movement of a manual control lever from an unlocked position thereof to a locked position thereof thereby to capture the position of said mast jacket by frictionally coupling together said inside and said outside screw threads and preventing idling rotation of said screw shaft.

2. The steering column for a motor vehicle recited in claim 1 wherein said clamp body comprises:

a pair of jaws on said clamp body separated by a slot and flexible toward and away from each other, and a pair of grooves in respective ones of said pair of jaws facing each other on opposite sides of said screw shaft and cooperating in defining said passage in said clamp body intersected by said slot so that flexure of said jaws toward each other reduces the diameter of said passage.

3. The steering column for a motor vehicle recited in claim 2 wherein said thrust bearing means comprises:

a pair of trunnions rigidly attached to said first one of said mast jacket and said vehicle body each having a bore therein, a pair journals on said screw shaft at opposite ends thereof rotatably supported in respective ones of said bores in said pair of trunnions, and a pair of annular shoulders on said screw shaft each facing a side of a corresponding one of said pair of trunnions.

4. The steering column for a motor vehicle recited in claim 3 wherein said control means operative to reduce the diameter of said variable diameter passage in said clamp body in response to pivotal movement of a manual control lever from an unlocked position thereof to a locked position thereof comprises:

a control shaft rigidly connected to said operating lever and rotatably supported on said clamp body, an annular shoulder on said control shaft outboard of a first one of said pair of flexible jaws on said clamp body, and a motion converting means operative in response to rotation of said control shaft to tension said control shaft between said annular shoulder thereof and a second one of said pair jaws on said clamp body thereby to flex said pair of flexible jaws toward each other.

5. The steering column for a motor vehicle recited in claim 4 wherein said motion converting means operative in response to rotation of said control shaft to tension said control shaft between said annular shoulder thereof and a second one of said pair jaws on said clamp body comprises:

an outside screw thread on said control shaft, and an inside screw thread on said second one of said pair jaws on said clamp body.

6. The steering column for a motor vehicle recited in claim 5 wherein:

said centerline of said clamp is parallel to said one of said horizontal and said vertical directions of adjustment of said mast jacket.

7. A steering column for a motor vehicle including a mast jacket supported on a body of said motor vehicle for adjustment in a horizontal direction and in a vertical direction, and a clamp for releasably capturing coincidentally a selected horizontal position and a selected vertical position of said mast jacket, characterized in that said clamp comprises:

a first screw shaft supported on said vehicle body for rotation about a first centerline of said clamp parallel to said vertical direction of adjustment having an outside screw thread thereon, a second screw shaft supported on said mast jacket for rotation about a second centerline of said clamp parallel to said horizontal direction of adjustment having an outside screw thread thereon, a thrust bearing means operative to prevent linear translation of said first screw shaft relative to said vehicle body in said vertical direction of adjustment, a thrust bearing means operative to connect said second screw shaft to said mast jacket for linear translation as a unit therewith in said horizontal direction of adjustment, a first split nut having a variable diameter passage around said first screw shaft and an inside screw thread in said variable diameter passage meshing with said outside screw thread on said first screw shaft, a second split nut having a variable diameter passage around said second screw shaft and an inside screw thread in said variable diameter passage meshing with said outside screw thread on said second shaft, a counterbore in said first split nut, a tubular boss on said second split nut seated in said counterbore in said first split nut and cooperating therewith and with said first and said second screw shafts in effecting unitary linear translation of said first and said second split nuts relative to said vehicle body in said vertical direction of adjustment and in restraining linear translation of each of said first and said second split nuts relative to said vehicle body in said horizontal direction of adjustment thereby to induce idling rotation of said first screw shaft in response to vertical adjustment of said mast jacket and idling rotation of said second screw shaft in response to horizontal adjustment of said mast jacket, and a control means operative to concurrently reduce the diameter of said variable diameter passage in each of said first and said second split nuts in response to pivotal movement of a manual control lever from an unlocked position thereof to a locked position thereof thereby to capture coincidentally a vertical adjusted position and a horizontal adjusted position of said mast jacket.

8. The steering column for a motor vehicle recited in claim 7 wherein said control means operative to concurrently reduce the diameter of said variable diameter passage in each of said first and said second split nuts in response to pivotal movement of a manual control lever from an unlocked position thereof to a locked position thereof comprises:

a bore in said first split nut through each of said flexible jaws thereon and through said counterbore therein, a bore in said second split nut through each of said flexible jaws thereon and through said tubular boss thereon, a control shaft connected to said control lever having a cylindrical shank rotatable in said bore in said first split nut and in said bore in said second split nut, an annular shoulder on said shank of said control shaft outboard of said first split nut, and a motion converting means operative in response to rotation of said control shaft to tension said control shaft between said annular shoulder thereon and an outboard one of said pair of flexible jaws on said second split nut thereby to concurrently flex together said pair of flexible jaws on said first clamp body and said pair of flexible jaws on said second clamp body.

9. The steering column for a motor vehicle recited in claim 8 wherein said motion converting means operative in response to rotation of said control shaft to tension said control shaft between said annular shoulder thereon and said outboard one of said pair of flexible jaws on said second split nut comprises:

an outside screw thread on said control shaft, and an inside screw thread in said bore in said second flexible nut in said outboard one of said pair of flexible jaws thereon.

* * * * *